United States Patent [19]

Bartko et al.

[11] Patent Number: 4,804,514
[45] Date of Patent: Feb. 14, 1989

[54] METHOD AND APPARATUS FOR NEUTRON DOSIMETRY

[75] Inventors: John Bartko, Monroeville; Stanwood L. Anderson, Plub Boro.; Thomas V. Congedo, Edgewood; Francis H. Ruddy, Monroeville, all of Pa.

[73] Assignee: Westinghouse Electric Corp., Pittsburgh, Pa.

[21] Appl. No.: 939,834

[22] Filed: Dec. 9, 1986

[51] Int. Cl.$^4$ .................. G21C 17/00; G01T 3/00
[52] U.S. Cl. .................... 376/154; 376/255; 250/390
[58] Field of Search ............ 376/154, 254, 255; 250/390 J, 390 B, 390 F, 390 R

[56] References Cited

U.S. PATENT DOCUMENTS

| | | | |
|---|---|---|---|
| 3,050,624 | 8/1962 | Janner | 376/255 |
| 3,076,895 | 2/1963 | Baldwin | 376/154 |
| 4,143,416 | 3/1979 | Luger et al. | 376/255 |
| 4,308,098 | 12/1981 | Neuner et al. | 376/254 |
| 4,404,164 | 9/1983 | Kopp et al. | 376/255 |
| 4,410,483 | 10/1983 | Tomada | 376/154 |
| 4,454,424 | 6/1984 | Strauss | 250/390 J |
| 4,582,672 | 4/1986 | Tuley, Jr. et al. | 376/255 |
| 4,634,568 | 1/1987 | Wimpee et al. | 376/255 |
| 4,649,276 | 3/1987 | Suzuki | 250/390 J |

OTHER PUBLICATIONS

"Gas-Filled Scintillation Detector for Ultracold Neutrons", *Sov. Phys. Lebedev. Inse. Rep.*, No. 11, 1974, pp. 17-23, Antonov et al.

"An Organic Scintillator Neutron Spectrometer Suitable for In-Phantom Studies", UKAEA AERE-R.9780, Jul. 1981, Harrison, pp. 1-41.

"A Position-Sensitive N-Detector for Neutron-Fragment Correlation Measurements", *Nuc. Inst. and Meth. in Phys. Res.* A254, 2/1987, pp. 342-348, Manduchi et al.

Primary Examiner—Deborah L. Kyle
Assistant Examiner—Daniel Wasil
Attorney, Agent, or Firm—D. C. Abeles

[57] ABSTRACT

A method and apparatus for measuring a neutron flux in which the neutrons induce fission reactions in the layer of fissile material, the fission reactions in turn inducing light pulses in a scintillator material. A photomultiplier tube detects the light pulses and emits an electrical pulse in response. The electrical pulses are summed, checked for coincidence, stored, and otherwise manipulated in order to detect and measure neutron flux. In one advantageous embodiment of the invention, several different fissile materials or coated and uncoated fissile materials are used in order to obtain a spectral distribution of the incident neutron flux. At another embodiment, opposed detectors are used in order to discriminate between actual neutron-induced fission events and background events.

19 Claims, 4 Drawing Sheets

METHOD AND APPARATUS FOR NEUTRON DOSIMETRY

BACKGROUND OF THE INVENTION

1. Field of the Invention

The present invention relates to a method and apparatus for neutron dosimetry and more particularly to a method and apparatus for neutron dosimetry in a nuclear power plant in applications where on-line measurement of neutron flux is necessary or desirable.

2. Background of the Invention

The measurement of neutron exposure in selected regions within or outside of a nuclear reactor pressure vessel (RPV) is of interest for several reasons. Measurement of neutron exposure outside of the RPV can be used to obtain a determination of the plant operational power level. Measurement of neutron exposure outside of the RPV can also be used to determine the spatial power distribution within the RPV. Furthermore, measurement of neutron exposure within or outside of the RPV can provide dosimetry information with respect to fast neutron exposure, from which resulting vessel embrittlement may be inferred.

The foregoing constitutes a broad range of applications, for which a variety of devices and techniques are currently employed. Detectors positioned outside of the reactor core (typically $BF_3$ counters) are used to detect thermal neutrons for plant power/power distribution measurements. Passive activation samples are used for radiometric inference of vessel fluence from within vessel measurements. Passive samples containing both radiometric activation samples and solid state track recorders (SSTR) are used in outside of vessel measurements for inference of vessel fluence.

Detectors positioned outside of the reactor pressure vessel are more accessible than those positioned within the RPV, but their removal can typically be effected only during a shutdown. While detectors so positioned are typically on-line devices, some are not. For example, passive counters must be transported to a laboratory in order to obtain data from them.

Thus, experience has taught that exceptionally useful features in neutron dosimetry include the following: (1) for power level/power distribution purposes, sufficient sensitivity to enable meaningful inference of integrated neutron fluence over a period of minutes to hours; (2) for vessel dosimetry applications, a lifetime of years in a high radiation (neutron or gamma ray radiation) environment, with a relative insensitivity to gamma radiation; (3) also for vessel dosimetry applications, a capability of periodic on-line readout of integrated neutron dose (fluence), to provide data useful in forming decisions concerning the operation of the plant (e.g., heat up/cool down rates); and (4) capability of providing independent measurements of thermal and fast neutron flux.

SUMMARY OF THE INVENTION

It is therefore an object of the present invention to provide a sensitive method and apparatus for neutron dosimetry on-line readout capability.

It is a further object of the present invention to provide a neutron dosimeter having a long lifetime and capable of discriminating between thermal and fast neutron flux.

Additional objects, advantages, and novel features of the invention will be set forth in part in the description which follows and in part will become apparent to those skilled in the art upon examination of the following or may be learned by practice of the invention.

To achieve the foregoing and in accordance with the purposes of the invention, as embodied and broadly described herein, there is provided an apparatus for measuring intensity of neutron flux comprising means exposed to the neutron flux for generating fission fragments at a rate proportional to said intensity, means exposed to a known fraction of the fission fragments for generating light signals in response to the known fraction, means, optically coupled to the light signal generating means, for generating electrical signals in response to the light signals, and means, electrically coupled to the electrical signal generating means, for processing electrical signals to determine the intensity.

In another aspect of the invention, multiple means for generating fission fragments having differing neutron energy thresholds for producing fission fragments are providing in order to obtain spectral data on neutron intensity. In yet another aspect of the invention, multiple means for generating light signals are positioned about the means for generating fission fragments, and the signals developed therein are checked for coincidence in order to discriminate events due to fission fragments from background events.

Methods according to the invention are also disclosed and claimed.

BRIEF DESCRIPTION OF THE DRAWINGS

These and other features and advantages of the present invention will become more apparent from the following written description read in conjunction in the drawings, in which.

DETAILED DESCRIPTION OF THE PREFERRED EMBODIMENTS

Reference will now be made in detail to the presently preferred embodiments of the invention, examples of which are illustrated in the accompanying drawings.

Figure 1:
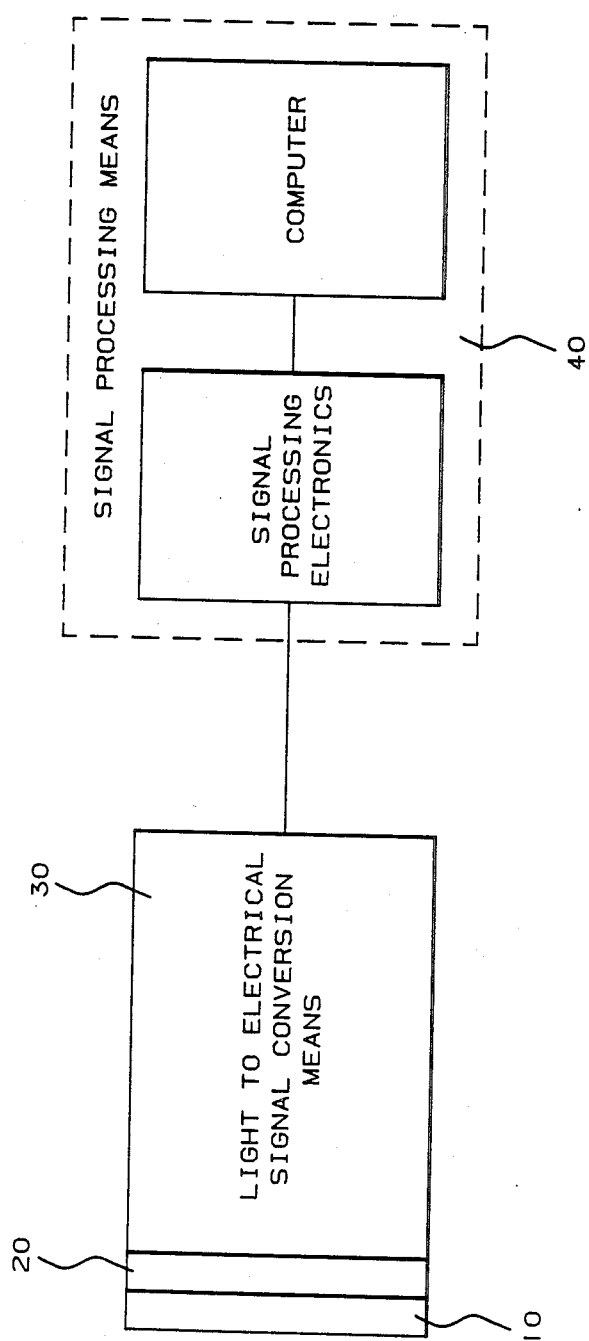
FIG. 1 is a functional block diagram of an apparatus for neutron dosimetry according to the present invention.

FIG. 1 shows the basic structure of a first embodiment of a neutron dosimeter according to the present invention. Numeral 10 designates means exposed to neutron flux for generating fission fragments at a rate proportional to the intensity. Adjacent fission fragment generating means 10 is light generating means 20. Light generating means 20 is a material which produces light, or scintillates, when traversed by a fission fragment. Optically coupled to light signal generating means 20 is electrical signal generating means 30. In the specific embodiment illustrated in FIG. 1, these means take the form of a photomultiplier tube attached to light signal generating means 20. It will be understood by one of ordinary skill in the art, however, that it is not necessary that the light signal generating means and electrical signal generating means be physically proximate, and is sufficient if they are merely optically coupled by light pipes or similar apparatus for conveying light. The electrical signal generating means are electrically coupled to means for processing electrical signals. These means may be any means for taking the raw data represented by the electrical signal from electrical signal generating means 30 and processing it into a form which reveals the measured intensity of neutron flux impinging on the fission fragment generating means. Thus, signal processing means 40 may include front-end electronics such as filters, triggers, and logical operation circuits. Signal processing means may also include a computer for manipulating, storing, and retrieving the data from the front-end electronics.

Fission fragment generating means 10 in the embodiment of FIG. 1 takes the form of a fissile layer, light signal generating means 20 the form of a scintillator layer, electrical signal generating means 30 the form of a photomultiplier tube, and signal processing means 40 the form of signal processing electronics and a computer. As mentioned, a light pipe may be inserted between the scintillator and photomultiplier.

The operation of such a device is straightforward as follows. The capture of neutrons by the fissile layer produces fission fragments. The scintillator layer is arranged in conjunction with the fissile layer so that the scintillator layer is traversed by a known fraction of the produced fission fragments. (In this context and in the claims, the known fraction may be any value up to and including unity). This known fraction of fragments produces light pulses in the scintillator which are detected by the photomultiplier. The electronic pulse response of the photomultiplier to the light pulses is then processed by the signal processing means. If the signal processing means includes a computer, the computer stores the data and retrieves it as quickly as necessary.

Considerations in the selection of material for the fission fragment generating means 10 are familiar to one of ordinary skill in the art. Many types of neutron dosimeters commonly employ a layer of fissile material. The neutron capture results in fission fragment ions with energies approaching 100 MeV. These energetic ions produce tracks in some dosimeters and in others they are used to ionize a gas. In the present invention, the ionizing power of these energetic ions is employed.

Neutron spectral information can be obtained by using various fissile isotopes, having differing neutron energy thresholds for fission. For example, $^{235}$U and $^{239}$Pu can be made to fission by neutrons of energies from thermal (approximately 0.1 eV) through fast (average energy approximately 1 MeV). The fission cross sections of $^{238}$U and $^{237}$Np, on the other hand, show distinct fission threshold versus neutron energy characteristics (approximately 0.8 MeV for $^{237}$Np and approximately 1.5 MeV for $^{238}$U). In fact, these "fast-fission" isotopes are currently in use in neutron dosimetry measurements. Further flexibility in determining threshold energies can be achieved through the use of cadmium coatings. These coatings show a near complete neutron absorption below 0.41 eV, and so can supply a basis for inference of thermal neutron flux by comparison of data from coated fissile layers and uncoated fissile layers.

As an example, consider $^{238}$U, which has the lowest spectrum-weighted fission cross section (0.3 barns) relative to a 1.5 MeV threshold flux, and thus provides the most conservative (smallest) number of fission fragments. If the dosimeter were to be used in a reactor cavity to obtain information on neutron flux at various locations outside of the thermal shield, the fast neutron flux at these locations is conceivably as low as $10^7$ n/cm$^2$/sec. The reaction rate at this location is thus $3 \times 10^{-18}$ reactions/atom/sec for $^{238}$U. The thicker that a 1 cm$^2$ layer of this material is, the more reactions can be produced and, hence, the more detector operation can be enhanced up to some maximum useful thickness.

The maximum useful thickness can be determined by the range of fission fragments in the fissile material. For example, continuing with $^{238}$U as an example, the ranges of 100 MeV fission fragments for such a material lie between 5 and 9 microns. Thus, a maximum useful thickness would be on the order of 5 microns. A 1 cm$^2$ of $^{238}$U, 5 microns thick, contains $2.4 \times 10^{19}$ atoms. After a day at the reaction rate assumed above, there would be produced approximately $6 \times 10^6$ reactions. After a month and a year, between $2 \times 10^8$ and $2.3 \times 10^9$ reactions/cm$^2$ would have accrued.

As for the scintillator layer, every form of radiation will produce light pulses in known scintillators. The basic problem, therefore, is finding ways of discriminating pulses produced by fission fragments from pulses produced by other sources. This task is very familiar to one of ordinary skill in the art, and many such means and ways have been developed for coping with this problem. One method of discriminating pulses is to take advantage of the fact that every fission fragment entering a scintillator will produce a response and that these fragments will have a well defined and short range in the materials. The maximum range of 100 MeV fragments in ZnS, CsI and NaI will be about 20 microns. If the scintillator were made of one of these materials, restricting its thickness to, for example, 25 microns means that it will be possible to produce all possible fragment produced light. Neutrons and gamma rays would have a very low probability of interaction in such a thin crystal. Further, electrons (beta rays or Compton electrons) above approximately 55 keV have a range greater than 25 microns. Thus, for gamma rays and beta rays it would be anticipated that maximum light output would correspond to 55 keV.

It is also possible to take advantage of the fact that light output is a strong function of the energy deposition rate, dE/dx, of the incident radiation. For electrons with MeV energies (typical of most beta rays and Compton electrons) the dE/dx is approximately $10^{-1}$ to $10^{-2}$ MeV/mg/cm$^2$. The neutrons will produce light pulses via the recoiling scintillator atoms with maximum energies less than 0.5 MeV. The maximum dE/dx for these will be less than 1 MeV/mg/cm$^2$. By contrast, the 100 MeV fission fragments will have dE/dx values on the order of 30 MeV/mg/cm$^2$. Thus, the intensity of the light pulses they produce will be significantly greater than those produced by other forms of radiation. As a result, the small height background radiation electron pulses from the photomultiplier can be easily discriminated by setting a suitable threshold on a single channel analyzer.

The above approaches should suffice to eliminate background radiation as a source of spurious signals. It is possible, however, to employ additional or alternative techniques. For example, it is possible to discriminate between light pulses produced by heavy, energetic fission fragments and those produced by other forms of radiation by detecting how long it takes the pulses to decay. The light produced by heavy, energetic fission fragments should take longer to decay.

Considerations for selecting a specific scintillator material are known to one of ordinary skill in the art. Virtually any scintillator can be used, but the scintillator materials mentioned above, zinc sulphide (ZnS), sodium iodide (NaI) and cesium iodide (CsI) have the advantage of being commercially available and also being fairly well understood, particularly with respect to their utilization as fission fragment detectors. CsI is non-hydroscopic, and, therefore, presents less of a problem in packaging and handling than does NaI. NaI, on the other hand, has a greater scintillation efficiency and a longer scintillator decay time than CsI. ZnS has an excellent efficiency and high light output for particle detection, but because it is polycrystalline it tends toward opacity for thicknesses greater than or equal to approximately 25 mg/cm$^2$. The particular design parameters of a given application will in most instances suggest which material is the best choice for the scintillator.

The light or scintillator pulse is converted to electron pulses by electrical signal generating means 30, in the presently preferred embodiment, a photomultiplier tube. The selection of the photomultiplier is not critical because the scintillator decay times of ZnS, NaI and CsI crystals, approximately 0.1 microseconds, 0.23 microseconds and 0.7 microseconds, respectively, are so long that speed is not crucial. Any commercially available tube commonly used with either of these materials should suffice. The long pulse decay times, however, make it important that the reaction rates produced by the fissile layer be selected to be sufficiently low that the pulse rate can be handled comfortably by the photomultiplier. Thus, reaction rates of interest are those for which the probability of pulse pileup is low. For practical applications the upper limit would be approximately $5 \times 10^5$ pulses/sec. It can be anticipated that at certain locations neutron recoils and gamma rays could produce scintillator pulses in excess of this limit. For example, near the primary concrete shield of a nuclear reactor, the neutron flux could be approximately $5.4 \times 10^{13}$ neutrons/cm$^2$/hr, and the gamma ray flux could be as high as $9 \times 10^{12}$ photons/cm$^2$/hr. The neutron cross sections and gamma ray attenuation coefficients enable calculation of the pulse rates produced by recoils and background gamma rays. Both quantities are in excess of $10^6$ pulses/sec. This will, however, not pose a problem because the energy deposited per pulse by these forms of background radiation is insignificant compared to the fission-fragment produced pulses. Thus, even if there is pulse pileup the effect will be minimal as long as the fission fragment pulse rate remains below the maximum level.

The electronics for the remainder of the system could typically include standard pulse processing systems commonly employed in nuclear spectroscopy. The signal pulses can be conditioned by amplification and discrimination, and then stored. In high radiation areas, it may be necessary to shield the electronics and wiring against induced currents due to background. An alternate approach could be to use bunched optical fibers as a light conduit between the scintillator and phototube. For long term use such a conduit would have to replaced periodically when the color centers produced by radiation attenuate the light signal too severely.

The computer can, of course, be programmed in a fashion clear to one of ordinary skill in the art to display graphics showing hourly, daily, or yearly variations in fluence. The shifts in neutron energies with time obtained from a set of detectors having different fissile layers can also be displayed in a similar fashion.

Figure 2:
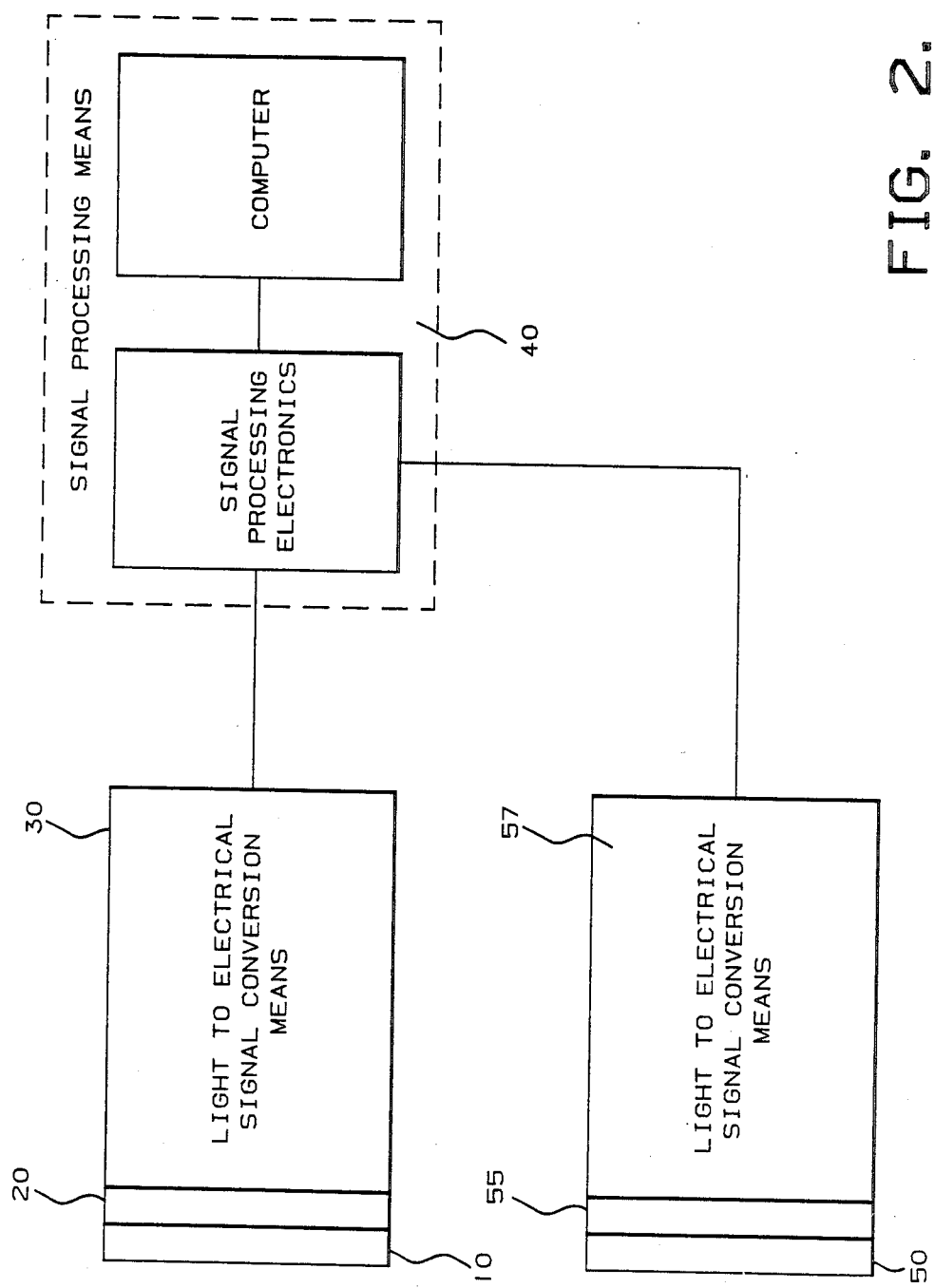
FIG. 2 is a functional block diagram of a second embodiment of an apparatus for neutron dosimetry according to the present invention.

FIG. 2 is an example of a system in which two detector assembles, each including a fissile layer, scintillator layer, and photomultiplier tube, are used in order to obtain spectral data on the neutron flux. The material comprising the second fissile layer 50 are selected to have different minimum threshold energies for fission. This is accomplished by judicious choice of materials or coatings as suggested above. For example, assume that the energy for fission of the material of first fissile layer 10 is less than the energy for fission of the material comprising the second fissile layer 50. The difference in flux measured by the first scintillator layer 20 and first photomultiplier tube 30 as opposed to that measured by the second scintillator layer 55 and second photomultiplier tube 57 would then give a measure of or a basis for inferring the rate of flux of neutrons having energies between the first energy of fission and the second energy of fission. Obviously, an array of several detector assemblies can be devised for obtaining a calculation and measurement for various energy ranges.

An actual neutron detector for dosimetry applications has been described above which is based on the use of a thin film of fissionable material placed next to a thin scintillator (ZnS, NaI or CsI) which emits flashes of light which can be identified as originating from the passage of neutron-induced fission fragments through the scintillator. For some applications, a complication may arise due to the emission of alpha particles by the fissionable materials. For high count rates, fission events may be difficult to distinguish from randomly summed alpha pulses. For example, if a $^{238}$U foil is placed in the reactor cavity of an operating power reactor, there will be a fission rate of about $3 \times 10^{-18}$ reactions/atom/sec. The effective maximum thickness (asymptotic sensitivity) of a uranium foil is $1.098 \times 10^{19}$ atoms/cm$^2$ for fission fragments, so that the fission rate for a thick foil would be $$(3 \times 10^{-18} \text{ fissions/sec/atom})(1.098 \times 10^{19} \text{ atoms/cm}^2) = 0.3 \text{ pulse/cm}^2\text{-sec}$$

The alpha decay rate for the same foil (assuming an effective thickness for alpha emission of 5 mg/cm$^2$) is $$(1.24 \times 10^4 \text{ dps/g})(5 \times 10^{-3} \text{ g/cm}^2) = 62 \text{ dps/cm}^2$$

Since the alpha emission rate is only about 200 times the fission fragment rate for this foil, adequate discrimination between fission fragments pulses and alpha particle pulses should be possible. In the cases of $^{235}$U and $^{239}$Pu fissionable layers, the alpha specific activity increases dramatically, but the fission rates also increase so alpha pulse pile-up should still not be a problem. In the case of $^{237}$Np, however, the fission rate is only about four times the fission rate for $^{238}$U or 1.2 fissions/cm$^2$-sec. The alpha decay rate (again assuming an effective thickness of 5 mg/cm$^2$) is $$(2.61 \times 10^7 \text{ dps/g})(5 \times 10^{-3} \text{ g/cm}^2) = 1.3 \; 10^5 \text{ dps/cm}^2$$

Since the alpha pulse rate will be about $10^5$ times higher than the fission fragment pulse rate for $^{237}$Np, pulse pile-up may well be a problem. This is significant because $^{237}$Np is a key isotope for neutron dosimetry applications due to its favorable neutron energy response function.

Figure 3:
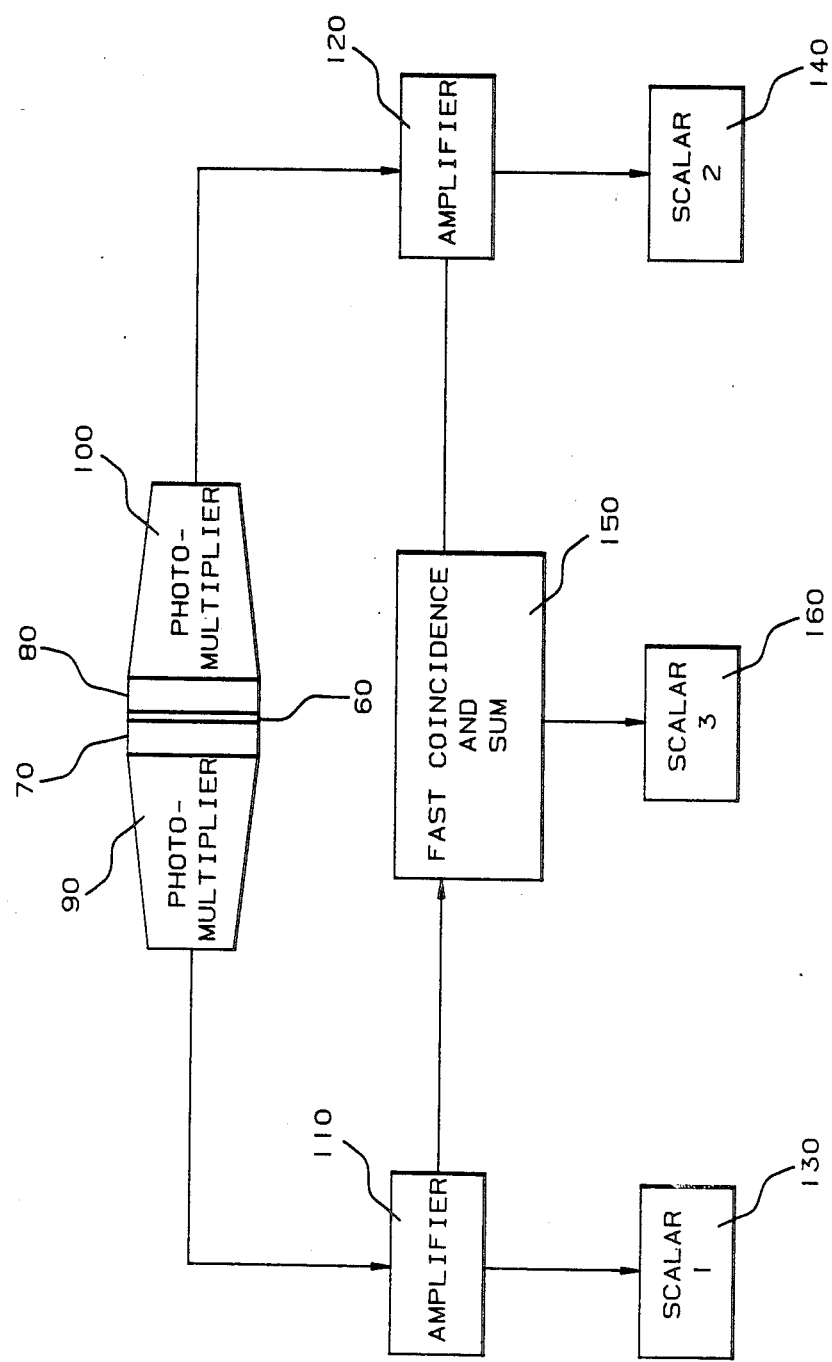
FIG. 3 is a functional block diagram of a third embodiment of a neutron dosimeter according to the present invention.

The embodiment of FIG. 3 is intended to alleviate this problem. It comprises an arrangement of a fissionable layer sandwiched between two optically isolated thin scintillators. As seen in FIG. 3, the thin fissionable layer 60 is placed between a first scintillator layer 70 and a second scintillator layer 80. Each scintillator layer has its own photomultiplier, designated respectively by 90 and 100. These photomultipliers will be referred to as the left-hand photomultiplier 90 and the right-hand photomultiplier 100, respectively. Pulses output by left-hand photomultiplier 90 are amplified by a suitable amplifier 110 while similarly the pulses output by right-hand photomultiplier are amplified by a right-hand amplifier 120. The pulses amplified by left-hand amplifier 110 are counted by a first scalar 130 while the pulses amplified by right-hand amplifier 120 are counted by a second scalar 140. In addition, the pulses amplified by right-hand amplifier 110 and left-hand amplifier 120 are checked for coincidence and summed if a coincidence exists by fast coincidence and summing circuit 150. A third scalar 160 accumulates the events summed by fast coincidence and summing circuit 150.

The apparatus of FIG. 3 would operate as follows. Neutron-induced fission events in the $^{237}$Np foil result in simultaneous emission of fission fragments in opposite directions, so that scintillations would be produced in both scintillators (which may be made of ZnS, NaI, or CsI) simultaneously. Third scalar 160 counts only coincident pulses resulting from either fission events (true coincidences) or random coincidences (accidental coincidences). If the coincidence fission pulses are summed, the resulting pulse would be much larger than any possible random coincidence (except for random fission coincidences which would be unlikely for low fission rates), since approximately 200 MeV is liberated in the fission process and only about 10 MeV can result from random coincidences of alpha particles.

The arrangement of FIG. 3 has the advantage that fission events are identified uniquely. In addition, all alpha background is suppressed, as well as beta, gamma, and neutron-induced recoil backgrounds. The arrangement has the additional advantage that the source of random noise, such as photomultiplier dark current, preamplifier noise, amplifier noise, and cable noise, are also suppressed. These advantages can be extremely valuable if the detector is to be used in harsh reactor environments where background radiation and electronic noise almost always present problems.

Long-term stability of the system can be verified by requiring that the count rates of the two scintillators (the totals in the first scalar and second scalar) be constant and equal. Any malfunctions due to loss of fissionable material, electronic noise, or other sources would be immediately apparent as this test would not be passed in those events.

The primary design requirement for the system is that the fissionable isotope layer be thin enough so that both fission fragments have a high probability of escape and detection. Foils thinner than about 100 $\mu$g/cm$^2$ fulfill this requirement. Foils of this thickness are also thick enough to ensure that the two scintillators are optically isolated.

Figure 4:
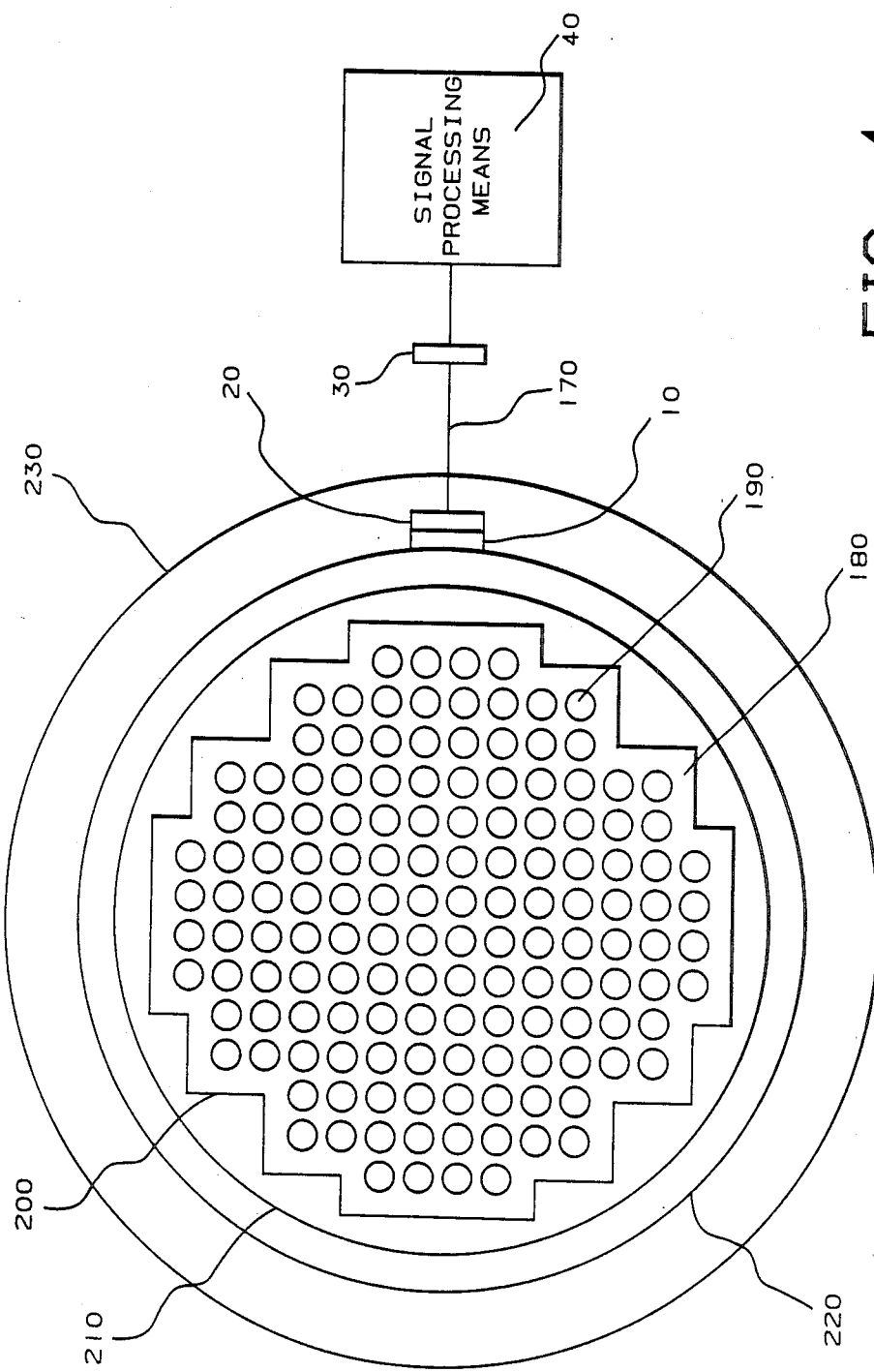
FIG. 4 is a block diagram of a nuclear reactor incorporating one embodiment of a dosimeter according to the present invention.

FIG. 4 shows a nuclear reactor incorporating one embodiment of a dosimeter according to the present invention. Numeral 10 again designates means for producing fission fragments, which are again in the form of a fissile layer. Numeral 20 designates a scintillator layer. Numeral 170 designates means for conveying light generated in scintillator 20 to photomultiplier 30. As mentioned above, light conveying means 170 may be any suitable means such as bunched optical fibers or a light pipe. Numeral 180 designates a reactor core, comprising a matrix of fuel rods 190. The reactor core is surrounded sequentially by a baffle 200, a core barrel 210, and a thermal shield 220. The fissile layer 10 is positioned within the reactor vessel 230 but outside the thermal shield 220.

The foregoing description has been in terms of a preferred embodiment merely for the purposes of illustrating the underlying principles of the invention. Nothing in the foregoing should be construed as limiting the invention to the specific embodiments discussed. Quite the contrary, it will be readily apparent to one of ordinary skill in the art that the concepts underlying the particular embodiments discussed herein have extremely broad application. The invention should therefore not be regarded as being limited to any of these specific embodiments, but instead should be regarded as being fully commensurate in scope with the underlying concept, as reflected in the following claims.

We claim:

1. Apparatus for measuring intensity of a neutron flux comprising:
   (a) means exposed to said neutron flux for generating fission fragments at a rate proportional to said intensity;
   (b) means exposed to a known fraction of said fission fragments for generating light signals in response to said known fraction of fission fragments, said light generating means being comprised of a solid layer of material having a thickness selected in accordance with a maximum range of said fission fragments in said light generating means;
   (c) means, optically coupled to said light signal generating means, for generating electrical signals in response to said light signals; and
   (d) means, electrically coupled to said electrical signal generating means, for processing said electrical signals to determine said intensity.

2. An apparatus as claimed in claim 1 wherein said means for generating fission fragments comprises a thin layer of fissile material.

3. An apparatus as claimed in claim 2 wherein said fissile material is selected from the group consisting of $^{238}$U, $^{237}$Np, $^{235}$U, and $^{239}$Pu.

4. An apparatus as claimed in claim 2 wherein said fissile layer has a thickness of approximately 5 microns.

5. An apparatus as claimed in claim 1 wherein said means for generating light comprises a scintillator.

6. An apparatus as claimed in claim 5 wherein said scintillator is comprised of a material selected from the group consisting of ZnS, NaI and CsI.

7. An apparatus as claimed in claim 1 wherein said means for generating electrical signals comprises a photomultiplier tube.

8. An apparatus as claimed in claim 1 wherein said light signal generating means and said electrical signal generating means are adjacent one another.

9. An apparatus as claimed in claim 1, further comprising means, optically coupled to said light generating means and said electrical signal generating means, for conducting light between said light signal generating means and said electrical signal generating means.

10. An apparatus as claimed in claim 9 wherein said means for conducting light comprises a plurality of optical fibers.

11. An apparatus as claimed in claim 9 wherein said light conducting means comprises a light pipe.

12. An apparatus as claimed in claim 1 wherein said means for generating fission fragments generates said fission fragments at a rate proportional to a flux intensity of neutrons having an energy above a first fission energy threshold, and further comprising:
 (a) second means exposed to said neutron flux for generating second fission fragments at a rate proportional to flux intensity of neutrons having an energy greater than a second fission energy threshold, said second fission energy threshold being different from said first fission energy threshold;
 (b) means exposed to a second known fraction of said second fission fragments for generating second light signals in response to said second known fraction.

13. An apparatus as claimed in claim 1 further comprising:
 second means on a side of said fission fragment generating means opposite a side of said fission fragment generating means on which said means for generating light signals is positioned, and exposed to a second known fraction of fission fragments for generating second light signals in response to said second known fraction;
 means, optically coupled to said second light signal generating means, for generating second electrical signals in response to said second light signals; and
 means, electrically coupled to said first electrical signal generating means and said second electrical generating means, for detecting coincidences between said first electrical signals and said second electrical signals.

14. A method for measuring the intensity of a neutron flux comprising the steps of:
 (a) generating fission fragments at a rate proportional to said intensity;
 (b) exposing a solid material scintillator means of a thickness approximately on the order of a maximum penetration range of said fission fragments in the material of said scintillator means to said generated fission fragments whereby light signals are generated;
 (c) generating electrical signals in response to said generated light signals; and
 (d) processing said electrical signals to determine said intensity.

15. A method as claimed in claim 14 wherein said step (a) comprises exposing a fissile material to said neutron flux.

16. Apparatus according to claim 1, wherein said solid layer of material is of a thickness approximately on the order of a maximum penetration range of said fission fragments in the material of said solid layer.

17. A method as claimed in claim 15 wherein said step (a) is limited to generating fission fragments at a rate proportional to an intensity of neutrons having an energy greater than a first threshold, and further comprising the steps of
 (e) generating fission fragments at a rate proportional to an intensity of neutrons having a second energy minimum energy level different from said first minimum energy level;
 (f) generating light signals in response to a known fraction of said fission fragments generated in said step (e);
 (g) generating electrical signals in response to said light signals generated in said step (f); and
 (h) processing said second electrical signals generated in said step (g) together with said signals generated in said step (c) in order to determine a spectral distribution of said neutron flux.

18. A method for measuring intensity of a flux of neutrons comprising the steps of:
 (a) simultaneously generating a first and second fission fragment in response to one of said neutrons, said second fission fragment propagating in a direction opposite from the direction of propagation of said first fission fragment;
 (b) generating a first light signal in response to said first fission fragment;
 (c) generating a second light signal in response to said second fission fragment;
 (d) detecting a coincidence between said first and second light signals; and
 (e) generating a signal indicative of total energy liberated by first and second fission fragments corresponding to said coincidence.

19. A nuclear reactor having a pressure vessel, and a core within said pressure vessel for generating a flux of neutrons and comprising:
 (a) means disposed within said pressure vessel and exposed to the flux of neutrons from said core for generating fission fragments at a rate proportional to an intensity of said flux;
 (b) light signal generating means exposed to a known fraction of said fission fragments for generating light signals in response to said known fraction, said light generating means having a thickness approximately on the order of a maximum penetration range of said fission fragments in said light generating means;
 (c) means, optically coupled to said light signal generating means, for generating electrical signals in response to said light signals; and
 (d) means, electrically coupled to said electrical signal generating means, for processing said electrical signals to determine intensity.

* * * * *